(12) United States Patent
Smith et al.

(10) Patent No.: US 6,480,524 B1
(45) Date of Patent: Nov. 12, 2002

(54) MULTIPLE BEAM ANTENNA

(75) Inventors: Martin Stevens Smith, Chelmsford (GB); Mark Newton, Harlow (GB); James E Dalley, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/394,835

(22) Filed: Sep. 13, 1999

(51) Int. Cl.$^7$ ............................................... H04L 27/26
(52) U.S. Cl. ....................... 375/140; 370/334; 342/373
(58) Field of Search ................................ 375/130, 140; 455/436, 442, 444, 446, 560, 561, 562, 440; 370/329, 331, 334, 332, 320; 342/359, 361, 367, 373, 379

(56) References Cited

U.S. PATENT DOCUMENTS

| | | | | |
|---|---|---|---|---|
| 4,633,259 A | * | 12/1986 | Hrycak ........................ 333/117 |
| 5,576,717 A | | 11/1996 | Searle et al. | |
| 6,094,165 A | * | 7/2000 | Smith ........................ 342/361 |
| 6,104,935 A | * | 8/2000 | Smith et al. ................ 455/561 |
| 6,151,512 A | * | 11/2000 | Chheda et al. .............. 370/331 |
| 6,167,036 A | * | 12/2000 | Beven ......................... 370/331 |
| 6,311,075 B1 | * | 10/2001 | Bevan et al. ............... 342/368 |
| 6,314,304 B1 | * | 11/2001 | Uesugi ........................ 455/517 |

* cited by examiner

Primary Examiner—Chi Pham
Assistant Examiner—Khanh Cong Tran
(74) Attorney, Agent, or Firm—Lee, Mann, Smith, McWilliams, Sweeney & Ohlson

(57) ABSTRACT

Sectorisation has been used in cellular communications networks in order to increase capacity without the need for obtaining new cell sites. However, previously, the increase in the number of main antenna beams provided by a base station transceiver has not produced a commensurate increase in capacity. For example, a hex sectored tricellular network is found to provide an increase in capacity by a factor of only 1.6 over a tri sectored tricellular network despite the fact that twice as many antenna beams are provided. A multiple beam antenna arrangement is described where the increase in capacity is commensurate with the increase in the number of antenna beams provided. In one example, a nine sectored tricellular CMDA network is described which comprises a multiple beam antenna arrangement with six antenna elements each provided as columns. The antenna beams may be orthogonal and a 6×6 Butler matrix beamformer is used which is advantageously loss less. The beamformers may be arranged back to back to allow sharing of power amplifiers to reduce costs and complexity and the number of cables required is reduced by the particular arrangement of beamformer used.

21 Claims, 6 Drawing Sheets

MULTIPLE BEAM ANTENNA

BACKGROUND OF THE INVENTION

1. Field of the Invention

This invention relates to a multiple beam antenna and to a cellular communications network comprising such a multiple beam antenna as well as to a base station transceiver comprising such a multiple beam antenna.

2. Description of the Prior Art

The term "cellular communications network" is used to refer to a communications network which is divided into geographical cells. For example, wireless communications networks are usually divided into cells which are geographical areas each of which contains a base station transceiver (BST) Mobile stations located in the communications network communicate with one or more base station transceivers, for example, the closest base station transceiver. Each base station transceiver has a limited range and a cell can be thought of as a geographical region over which a base station transceiver is intended to operate effectively.

Mobile stations such as mobile telephones may be located within a cellular communications network and send and receive signals to and from the base station transceivers. Each mobile station (not shown) operating within a cell requires a certain amount of bandwidth to operate and because the total bandwidth of base station transceivers is limited the number of mobile stations which can operate within a cell is limited.

In general an object of cellular radio communications system design is to reduce the number of cell sites required by increasing their range and or capacity. The term, "capacity" is used herein to refer to any suitable measure which provides an indication of how many conventional mobile stations or other terminals are able to communicate effectively with a given antenna arrangement. Cell sites are expensive, both in terms of the equipment required and the need for a geographical site for each cell site. Geographical sites are costly and require extensive effort to obtain planning permission. In some areas, suitable geographical sites are not available.

When a cellular radio system is set up in an area of high demand, such as a city, then cell site communications capacity, rather than range, usually limits cell size. An increased cell site capacity would therefore reduce the required number of cell cites and so reduce costs.

Another aim in cellular communications network design is flexibility. That is, allowance needs to be made for changes in demand by users of the network. Previously, increases in demand have been dealt with by for example, installing new base station transceivers and splitting cells. This increases the number of cells but is expensive and time consuming and if the geographical pattern of demand changes over time the newly installed base station transceivers may later become redundant.

Another problem is that interference can occur, for example, if a signal is received by a base station transceiver, it could have been received from a mobile station within the base station transceiver's cell or from a mobile station or base station transceiver within an adjacent or nearby cell.

One way of reducing such interference is to use two or more directional antennas at a cell site, instead of a single omni-directional antenna. This acts to reduce interference because signals received by a directional antenna at a base station transceiver have to be received from a particular direction and the likelihood of signals being received from that direction from adjacent or nearby cells is reduced. Each directional antenna can be thought of as operating effectively. over part of a cell and this part is termed a "sector". By adjusting the number of sectors in a cell, the capacity of that cell can be adjusted without the need for cell splitting. For example three directional antennas have previously been used to create a tri-sectored cell. In this way the capacity of each cell is increased relative to a cell using a single omni-directional antenna because interference is reduced as described above.

Another problem for cellular or sectored communications systems in general is that so called "handoff" is required and this takes up valuable processing capacity within the base station transceiver and mobile stations. As a mobile station moves from one cell to another in a cellular communications system, transfer of the communication link from a first base station transceiver in the first cell to a second base station transceiver in the second cell is required and takes place by a process termed "handoff". In a sectored cell, a mobile station may also move from one sector to another necessitating additional handoffs between the antenna beams of each sector within the cell. As the number of sectors increases, so does the number of handoffs and this makes increasing demands on the processing and communications capacity of the communications network.

Sectorisation is particularly advantageous in spread spectrum communications systems, such as code division multiple access (CDMA) communications systems. More detail about CDMA systems is given below. In such systems, base station transmissions, both in different sectors and in different cells, are typically in the same frequency band. Because these transmissions are in the same frequency band interference between them can be a particular problem and sectorisation is advantageous in reducing this. Another feature of spread spectrum communications systems such as CDMA and UMTS communications systems, relates to antenna beam overlap. If there is a high degree of overlap between antenna beams operating in the same frequency band (for example, in a CDMA or UMTS system) then the risk of interference between those beams increases. In order to reduce this interference, the antenna beams are separated as far as possible, but not so far as to leave large regions of the cell uncovered by any antenna beam. Mobile stations within such "uncovered" regions are unable to communicate effectively with a base station transceiver or require larger amounts of power in order to do so.

Another problem relates to the high cost of electronics and cables used within base station transceivers.

It is accordingly an object of the present invention to provide a multiple beam antenna which overcomes or at least mitigates one or more of the problems noted above.

SUMMARY OF THE INVENTION

Further benefits and advantages of the invention will become apparent from a consideration of the following detailed description given with reference to the accompanying drawings, which specify and show preferred embodiments of the invention.

According to a first aspect of the present invention there is provided a multiple beam antenna arrangement suitable for use in a cell of a cellular communications network, said cell being divided into a plurality of regions, and said arrangement being arranged to provide a specified capacity for communication with terminals located in a first one of said regions, said arrangement comprising:

an apparatus arranged to provide two or more directional antenna beams per region; and wherein said apparatus is further arranged such that in use said capacity is greater than the capacity provided to a region of a corresponding multiple beam antenna arrangement which provides only one antenna beam per region by a factor of approximately the number of antenna beams provided for said first region.

A corresponding cellular communications network is also provided comprising a plurality of cells, and wherein a plurality of said cells each contain a multiple beam antenna arrangement, said multiple beam antenna arrangement being suitable for use in a cell of a cellular communications network, said cell being divided into a plurality of regions, and said arrangement being arranged to provide a specified capacity for communication with terminals located in a first one of said regions, said arrangement comprising:

an apparatus arranged to provide two or more directional antenna beams per region; and wherein said apparatus is further arranged such that in use said capacity is greater than the capacity provided to a region of a corresponding multiple beam antenna arrangement which provides only one antenna beam per region by a factor of approximately the number of antenna beams provided for said first region.

A corresponding base station transceiver is also provided comprising: a multiple beam antenna arrangement suitable for use in a cell of a cellular communications network, said cell being divided into a plurality of regions, and said arrangement being arranged to provide a specified capacity for communication with terminals located in a first one of said regions, said arrangement comprising:

an apparatus arranged to provide two or more directional antenna beams per region; and wherein said apparatus is further arranged such that in use said capacity is greater than the capacity provided to a region of a corresponding multiple beam antenna arrangement which provides only one antenna beam per region by a factor of approximately the number of antenna beams provided for said first region.

This provides the advantage that the capacity of a cell in a cellular communications network is increased in an effective manner thus enabling costs to be reduced. Also, the multiple beam antenna arrangement may be used at existing cell sites in order to increase capacity without the need to find new cell sites.

Preferably said apparatus that is arranged to provide two or more directional antenna beams per region is arranged to provide three or more directional antenna beams per region and comprises six antenna elements. This provides the advantage that a good interleaving pattern is obtained between adjacent cells. The good interleaving allows the antenna beams to be provided with a low degree of overlap and this helps to reduce interference and improve performance and capacity.

Preferably, the antenna arrangement is suitable for use in a cell of a cellular, spread spectrum, communications network. This provides the advantage that capacity is increased effectively in a spread spectrum communications network where interference is a particular problem.

Furthermore, it is preferred that the number of cables is equal to the number of antenna beams that said apparatus is arranged to provide. This provides the advantage that costs are reduced and installation and maintenance of the antenna arrangement is simplified because, for example, in the case that three antenna beams are provided using six antenna elements, only three cables are required instead of six, one per element.

Advantageously, the antenna arrangement comprises at least one power amplifier that is arranged to be shared in use, across the antenna beams associated with a given region. This enables costs to be significantly reduced because the number of power amplifiers is reduced by allowing them to be shared. Also, greater flexibility is provided. This is especially useful in spread spectrum communications systems where power amplifiers are complex and expensive.

Preferably the antenna arrangement incorporates an amplitude taper arrangement such that in use, sidelobe levels are reduced. This provides the advantage that capacity is increased because lower sidelobe levels reduce interference.

Advantageously, said apparatus, that is arranged to provide two or more directional antenna beams, is further arranged such that said directional antenna beams are orthogonal in use. This provides the advantage that a loss less multiple beamformer may be used which improves performance of the antenna arrangement and increases capacity.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
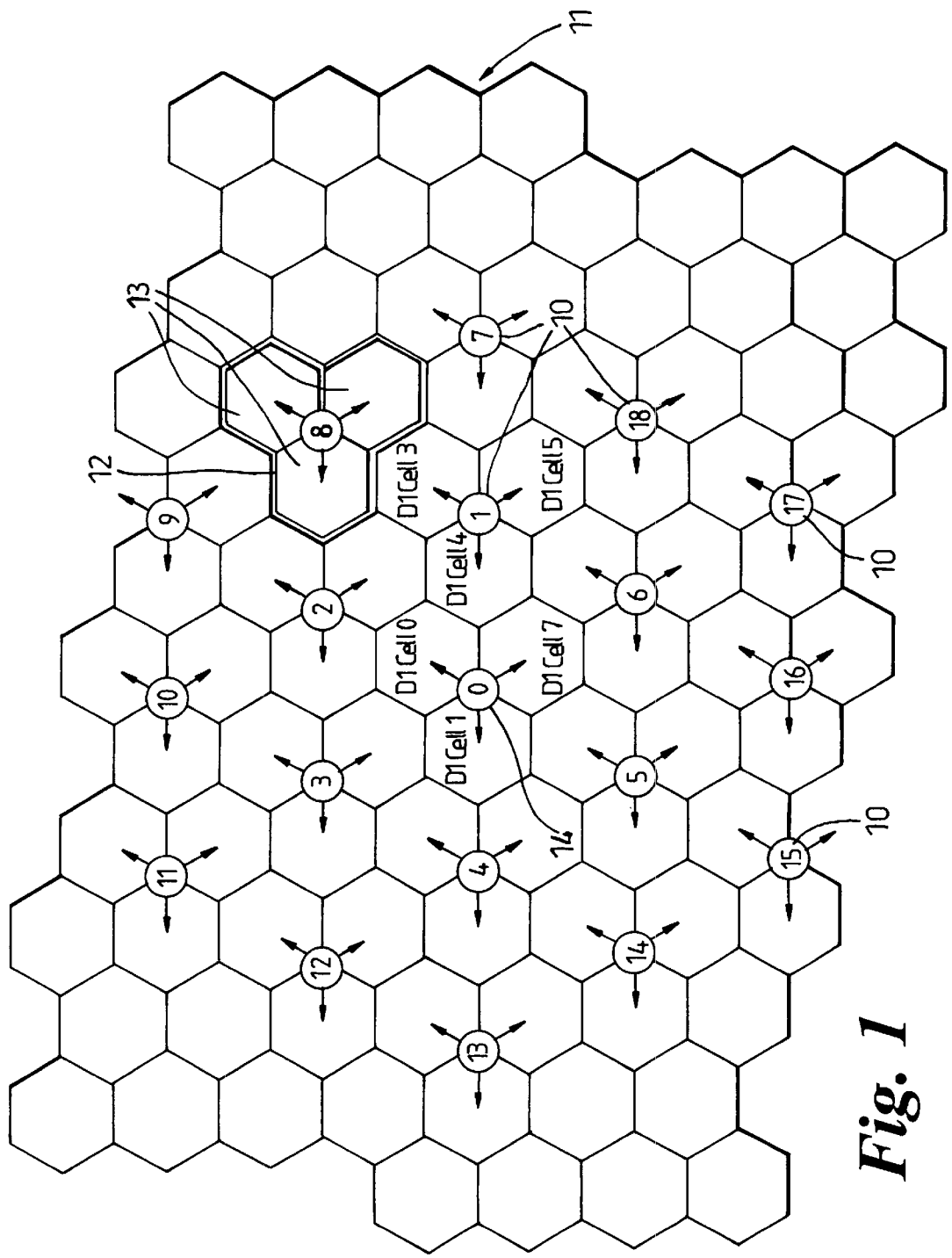
FIG. 1 is a schematic diagram of a tricellular communications network.
Figure 1B:
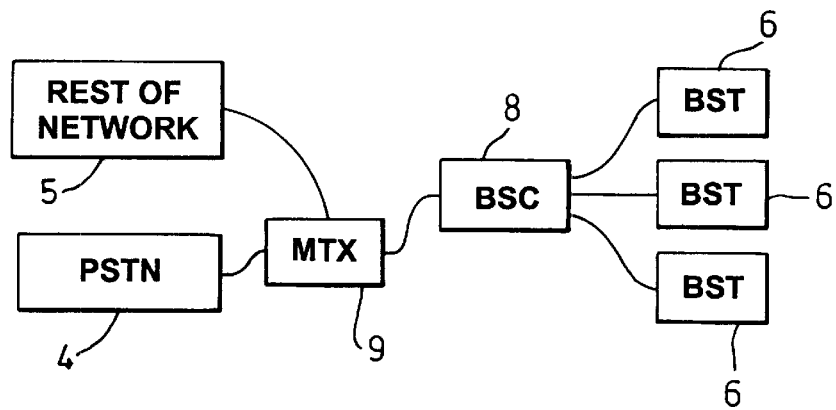
FIG. 1b is a block diagram of the communications network of FIG. 1.

FIG. 1 illustrates an example of a tricellular communications network 11 in which a plurality of base station transceivers 10 are located, each base station transceiver 10 being located in the centre of a cell 12. Each cell is made up of three approximately equally sized tri-cells 13 which are hexagonal in shape. The hexagonal tri-cells 13 of the cells 12 are positioned next to one another so that they tessellate and form a honeycomb pattern.

A ring of base station transceivers and cells are located around the innermost base station transceiver 14 and cell and form a so called first tier. Similarly, a ring of base station transceivers and cells are located around the second tier and form a so called second tier.

Figure 2:
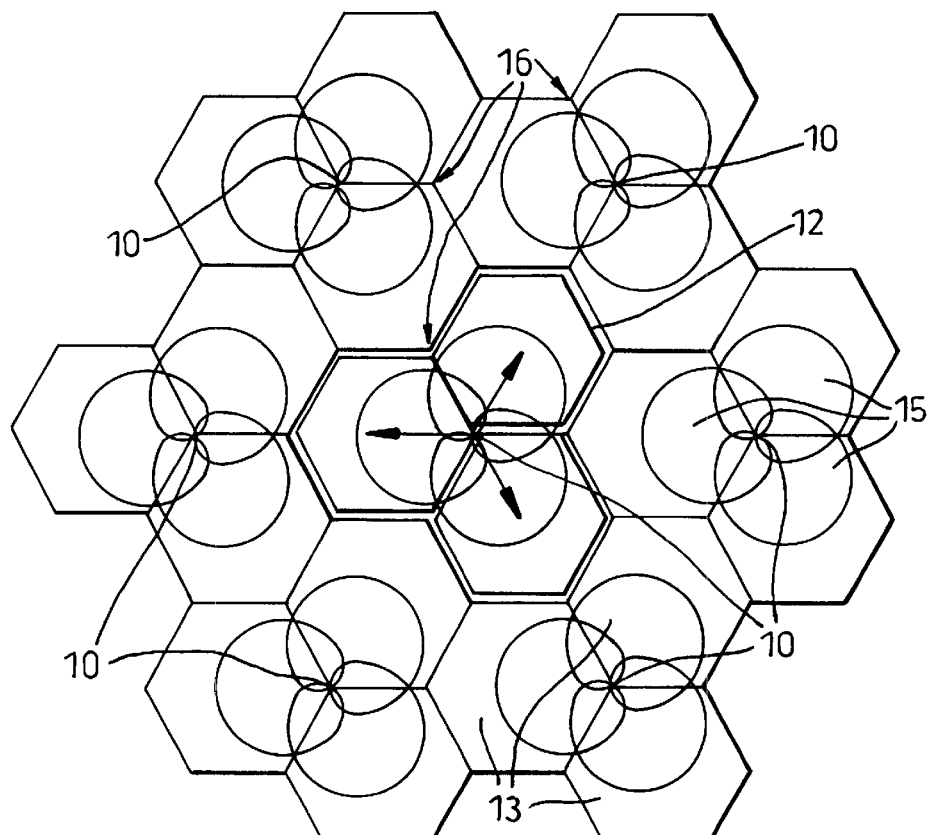
FIG. 2 is a schematic diagram of one tier of a tricellular communications network with a tricellular beam pattern.

As shown in FIG. 2 the communications network comprises a base station controller BSC which is connected to each of the BSTs. This connection may be physical or may involve radio communication links. In turn, the BSC is connected to a mobile telephone exchange (MTX) 9 and through this to the rest of the mobile network 5 and perhaps also to the public switched telephone network (PSTN) 4.

The term "tri-cellular" is used to refer to the fact that each cell 12 is made up of three tri-cells 13. Cellular networks where each cell is hexagonal in shape and a base station transceiver is located in the centre of each cell may also be used but would not be referred to as tricellular networks. In such a situation, the base station transceiver could comprise three directional antennas and the cell would then have three sectors. The term, "region" is used to refer to an area of a cell which may either be a sector or may be a sub-cell such as a tri-cell.

An example of one tier of a tricellular communications network with cells 12 is shown in FIG. 2. In this case, each base station transceiver 10 comprises three directional antennas of 120° azimuthal beamwidth. Each antenna beam is directed substantially over one tri-cell 13 of a cell for the base station transceiver concerned and each region 15 of a cell "covered" by an antenna beam is illustrated in FIG. 2 by the circular forms 15.

Figure 4:
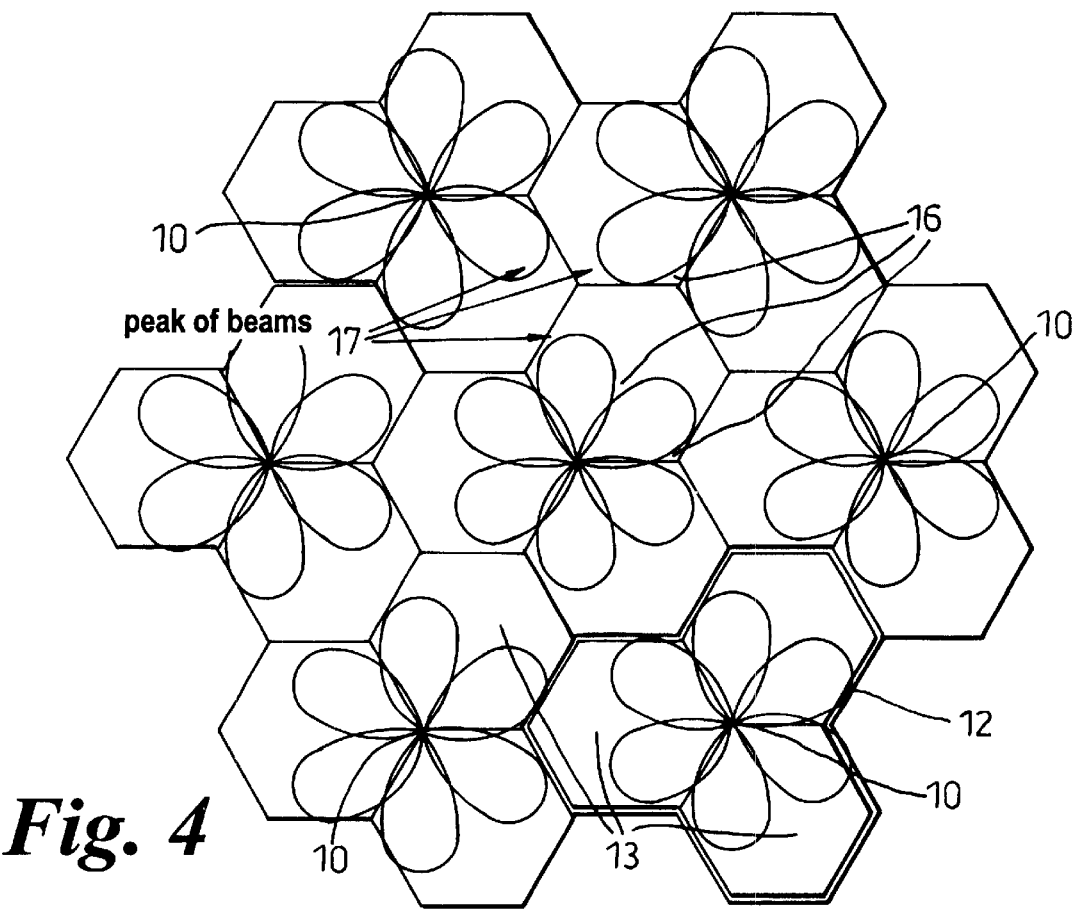
FIG. 4 is a schematic diagram of one tier of a tricellular communications network with a two beam, four element, tricellular beam pattern.

In order to further increase cell capacity, tricellular networks may incorporate two directional antennas per tricell. This type of communications system is referred to as having a "hex sectored antenna pattern" where each antenna beam operates over a sector of the cell. An example of one tier of such a communications network is shown in FIG. 4. Capacity is increased because of the extra directional antennas. This type of system is described in pending U.S. patent application Ser. No. 09/221,365 Bassirat, assigned to Nortel Networks Corporation.

In order to further increase capacity, three antenna beams per tricell may be used (which gives nine beams per cell). This type of communications network is referred to as having a "nine sectored antenna pattern". Pending U.S. patent application Ser. No. 09/198,387, Bevan, assigned to Nortel Networks Corporation, describes such a communications network and FIG. 6 of the present application illustrates such a communications network.

The present invention recognises that a particular problem with the two and three antenna beam per sector systems described above is that more antenna beams must be produced and this requires extra equipment and associated installation and maintenance costs. As well as this, if two antenna beams are used per sector as opposed to one per sector, then the increase in capacity achieved is substantially less than a two fold increase. However, a two fold increase in provision of antenna beams has been entailed. Similarly, if three antenna beams are used per sector as opposed to one per sector, the increase in capacity is substantially less than three fold. Previous systems have simply accepted that the increase in capacity is not commensurate with the increase in the number of antenna beams and have not recognised this as a particular problem. The present invention solves this problem and problem. The present invention solves this problem and provides for example, a communications network which uses three antenna beams per sector to produce a three fold increase in capacity.

The inventors carried out a search for possible factors which may contribute the to the fact that an increase in the number of antenna beams is not commensurate with the capacity increase. Several relevant factors were identified including antenna beam characteristics such as cross-over points and sidelobes as well as interleaving patterns.

FIG. 2 shows a three-sectored communications network with one antenna beam per sector. The present invention involves recognising that, in this example, antenna beams from adjacent cells 12 interleave. In the region just beyond where two antenna beam regions 15 from the same base station overlap, there is a gap or null 16 in the area covered by the three antenna beams associated with the base station. Such gaps or nulls 16 are problematic because they represent geographical areas where mobile stations are unable to communicate optimally with the base station. However, in the present example, interleaving reduces this problem. That is, the central or peak region of an antenna beam from an adjacent cell is directed towards each gap or null 16 by virtue of the positioning of the cells and the orientation of the antenna beams.

FIG. 4 shows a three-sectored cellular communications network with two antenna beams per sector. The present invention involves recognising that, in this case, interleaving is poor because central regions of the antenna beams 17 are directed towards similar central regions of antenna beams from adjacent cells rather than towards null regions 16. This is problematic because mobile stations that are located in these null regions 16 require larger amounts of power in order to operate effectively as compared to mobile stations elsewhere in the communications network. This has the effect of decreasing capacity.

Figure 6:
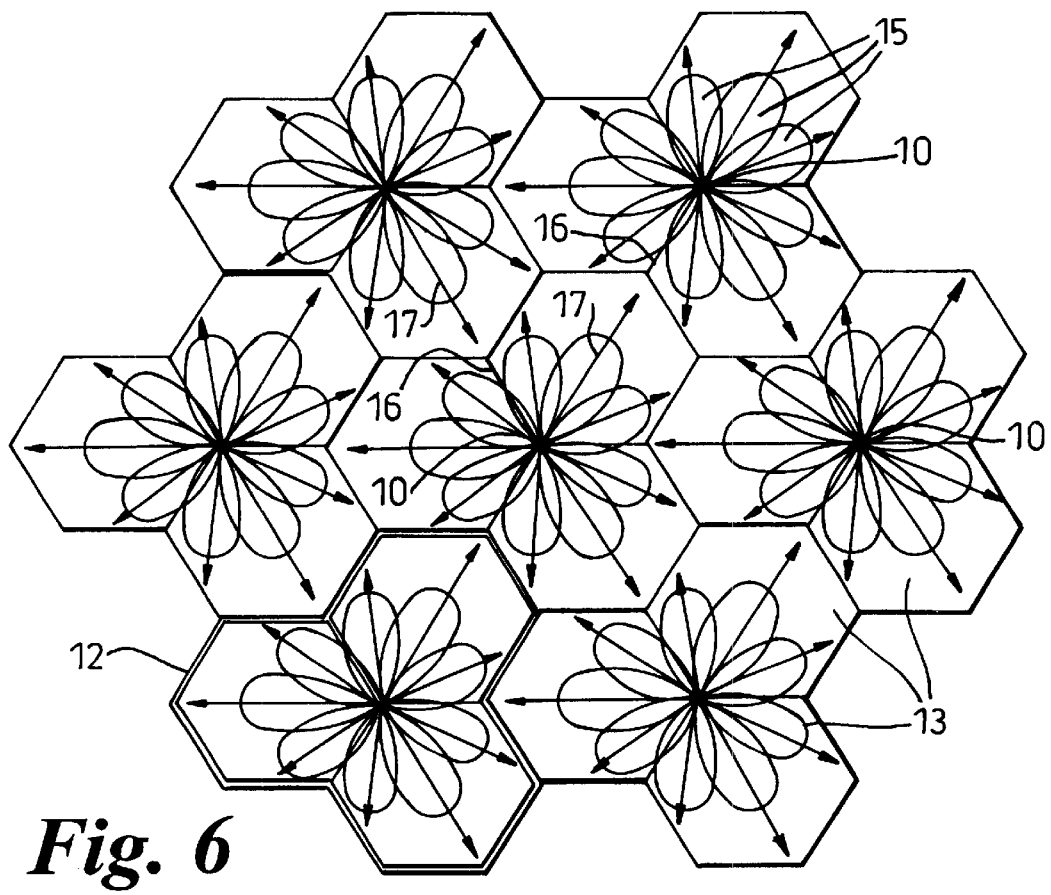
FIG. 6 is a schematic diagram of one tier of a three beam, four element, tricellular beam pattern.

FIG. 6 shows a three-sectored cellular communications network with three antenna beams per sector. The present invention involves recognising that, in this case, interleaving is relatively good because each null region 16 is compensated for by the peak of an antenna beam 17 from an adjacent cell 12.

Figure 3:
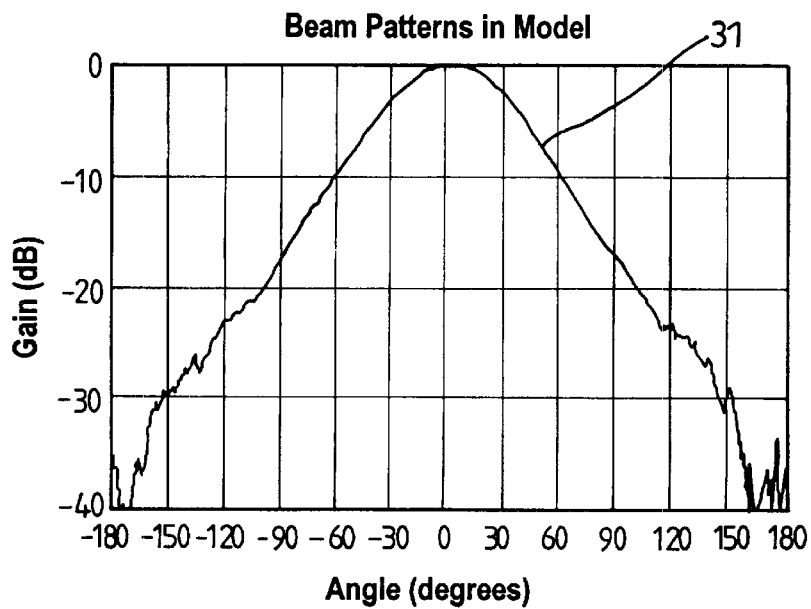
FIG. 3 shows a single antenna beam pattern, suitable for use in the communications network of FIG. 2.

A comparison of antenna beam patterns was made for each of the tri-sectored, hex-sectored and nine-sectored examples discussed above. FIGS. 3, 5, 7 and 8 are graphs of antenna beam gain in dB against the angle (in degrees) of the beam relative to the boresight of the central beam. FIG. 3 illustrates an antenna beam pattern suitable for use in a tricellular communications network with one antenna beam per tri-cell (for example, as in FIG. 2). As can be seen from FIG. 3, the beam pattern is formed from a single lobe 31 representing the single antenna beam.

Figure 5:
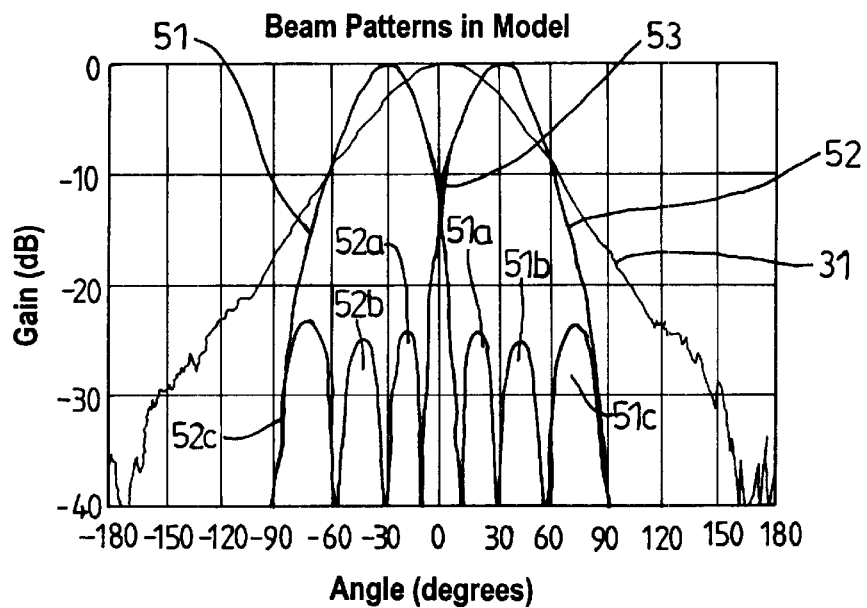
FIG. 5 shows two antenna beams, produced using four antenna elements, and suitable for use in the beam pattern of FIG. 4.

Similarly, FIG. 5 illustrates the pattern for a pair of antenna beams suitable for use in the hex-sectored communications network of FIG. 4. The beam pattern 31 of FIG. 3 is shown superimposed on the pattern for the pair of antenna beams for ease of comparison. Each member of the pair of antenna beams comprises a main lobe 51, 52 together with various side lobes 51a, 51b, 51c, 52a, 52b, 52c. The point at which the main lobes 51, 52 cross over one another (labelled 53 in FIG. 5) occurs just below the −10 dB level and the side lobes are all below the −20 dB level.

Figure 7:
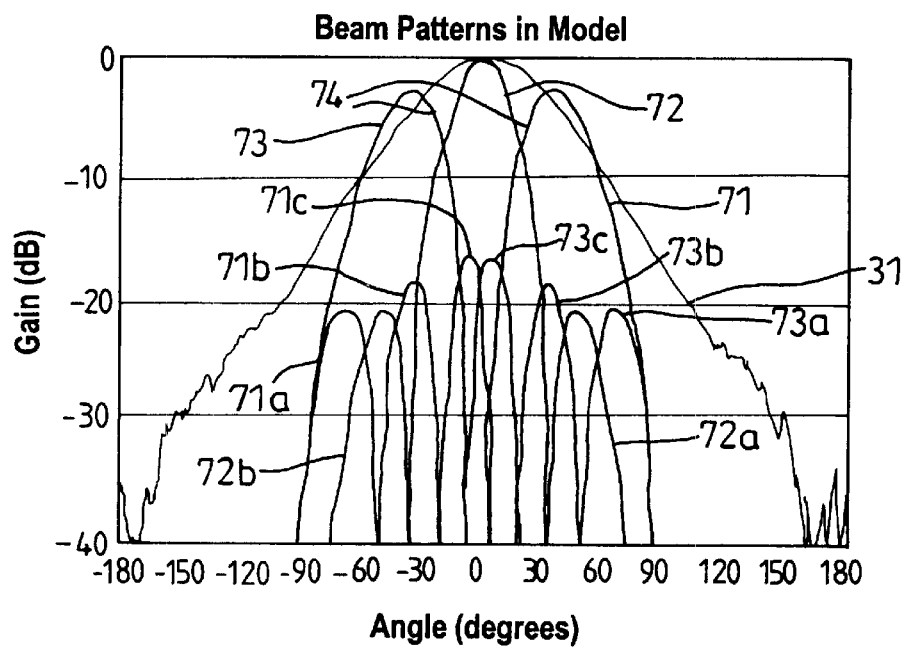
FIG. 7 shows three antenna beams, produced using four antenna elements, and suitable for use in the beam pattern of FIG. 6.

FIG. 7 illustrates the pattern for three antenna beams suitable for use in the nine-sectored communications network of FIG. 6. The beam pattern 31 of FIG. 3 is shown superimposed on the pattern for the three antenna beams for ease of comparison. Each of the three antenna beams comprises a main lobe 71, 72, 73 together with various side lobes 71a, 71b, 71c, 72a, 72b, 73a, 73b, 73c. The points at which the main lobes 71, 72, 73 cross over one another (labelled 74 in FIG. 7) occur above the −10 dB level. Also, the side lobes 71a, 71b, 71c, 72a, 72b, 73a, 73b, 73c are at or above the −20 dB level.

The cross-over points give an indication of the amount of overlap between the main antenna beam lobes; the higher the cross-over point the greater the amount of overlap. As mentioned above, the more overlap between antenna beams the greater the risk of interference. However, if the cross-over points are too low, gaps or null points exist between the antenna beams which is problematic for mobile stations located within these null points as discussed above.

The presence of side lobes indicates that some of the power of the antenna is taken up in the creation of side lobes and these interfere with adjacent beams.

Simulation

In order to analyse the tri-cellular communications network configurations discussed above (one antenna beam per tri-cell; two antenna beams per tri-cell and three antenna beams per tri-cell) a simulation was created. This modelled two tiers of a CDMA tri-cellular communications network with 19 base station transceivers as illustrated in FIG. 1.

The simulation considered the effect of randomly placing mobile stations within a central cell of the tri-cellular communications network. For each such random placing, the received pilot power from each of the 19 base station transceivers was estimated. The received pilot power is the amount of power received by the mobile station from a base station transceiver. This was estimated on the basis of the gain of the base station transceiver's antenna pattern (at the appropriate angle) and a median, "flat-earth" non-shadowing path loss model (to estimate the amount of power lost or dissipated into the environment during transmission) The antenna beam patterns were as illustrated in FIGS. 3, 5 and 7.

The estimated pilot power values were then used to calculate an Ec/Io ratio, where Ec is the pilot energy per chip and Io is the total power spectral density from all signals. This Ec/Io ratio provides an estimate of the carrier-to-interference ratio (CIR) that the mobile station would "see" from each base station transceiver.

The CIR value was used to decide which base station transceivers a mobile station would be served by. For example, if a base station transceiver's CIR exceeded a certain threshold (called Tadd) then the mobile station was considered to establish a link with it. However a link was only established between a mobile station and a base station if that mobile station was linked to less than a threshold number of base station transceivers. In the present example, this threshold number of base stations was three although other values can be used. This enables, for each mobile station, the set of base station transceivers which serve that mobile station to be determined. This set is termed an "active set".

An Ec/Ioc ratio was then calculated where Ec is the total pilot energy per chip that results from the base station transceivers in the active set. Ioc was calculated as the power spectral density of bearers within an "interference set" which was the set of bearers from base station transceivers to which the mobile station was not linked.

This method was repeated for a plurality of random mobile station locations within the innermost cell of the communications network. In this way a set of Ec/Ioc figures were obtained for that cell and using these figures an estimate of the distribution of power allocation over that cell was obtained. The power allocated for a particular mobile station was estimated as the reciprocal of the Ec/Ioc for that mobile. However, correction factors were incorporated for handoff (more power allocated) and diversity (less power needed to combat fast fading).

An average of these estimates of the power allocation for particular mobile stations was then obtained to give a Mean Power Allocation (MPA) value for each of the, tri-sectored, hex-sectored and nine-sectored tricellular arrangements discussed above. Taking the MPA value for the tri-sectored case (for example, as in FIG. 2) as the reference value, the increase in capacity relative to this reference was calculated for each of the hex-sectored and nine-sectored arrangements. That is the MPA value is an example of a suitable measure which gives an indication of capacity. Thus, for the hex-sectored arrangement the relative capacity gain was found to be 1.6 whereas for the nine-sectored case the relative capacity gain was found to be 2.3. This means that for the hex-sectored case, twice as many antenna beams must be provided as compared to the tri-sectored case and yet the increase in capacity is well below a two fold increase. Similarly, for the nine-sectored case, three times as many antenna beams must be provided as compared to the tri-sectored case and again the capacity increase is not commensurate with the increase in the number of antenna beams.

The influence of the potentially relevant factors mentioned above on the capacity increase was investigated using the simulation. In this way a nine-sectored tricellular arrangement (using three antenna beams per region or tri-cell) which provides a three fold increase in capacity relative to the tri-sectored case was discovered.

Nine-sectored Tricellular Arrangement using Six Antenna Elements

Figure 8:
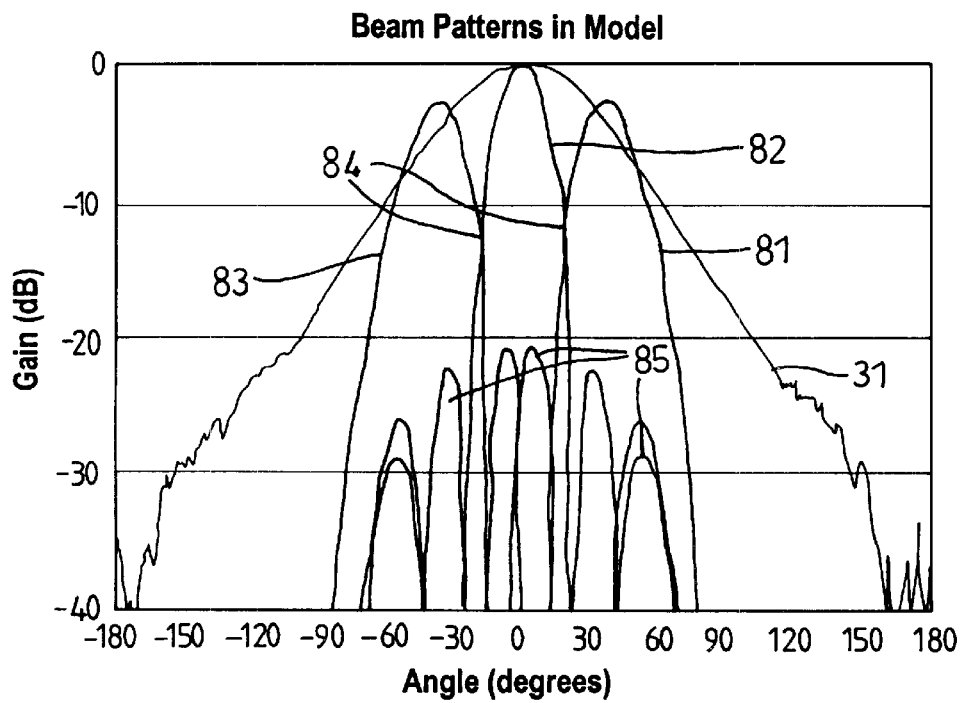
FIG. 8 shows three antenna beams, produced using six antenna elements, and suitable for use in the beam pattern of FIG. 6.

The nine-sectored tricellular arrangement mentioned immediately above uses six antenna elements as opposed to four antenna elements as in the nine-sectored tricellular arrangement described in Bevan, U.S. patent application Ser. No. 09/198 387. The antenna beam pattern for one tri-cell of the nine-sectored, six element arrangement is illustrated in FIG. 8 with the antenna beam pattern 31 of FIG. 3 shown superimposed for ease of comparison. As illustrated in FIG. 8 the antenna beam pattern comprises three main lobes 81, 82, 83 for which the cross over points 84 are below the −10 dB level. This enables interference to be reduced, unlike the nine-sectored arrangement of Bevan, which has relatively high cross-over points (as illustrated in FIG. 7). By using six as opposed to four antenna elements, the beams within a tricell are more directional and hence have less overlap. Also there are several side lobes 85 although these are below the −20 dB level. Using this antenna beam pattern in the simulation the relative capacity gain obtained was 3.0 (relative to the tri-sectored case of FIG. 2).

Because the arrangement is a nine-sectored one the positioning and arrangement of the antenna beams within the tri-cells is the same as illustrated in FIG. 6 and as for the arrangement of FIG. 6, interleaving is good unlike the hex-sectored arrangement discussed above. Because interleaving is good, it is possible to use relatively low cross-over points. That is, low cross-over points bring the disadvantage that null regions exist between the antenna beams and in these regions communication is less effective. However, when interleaving is good, null regions between antenna beams from one base station transceiver are compensated for to some extent by the antenna beams from adjacent cells. Thus by designing a communications network with good interleaving, lower cross-over points can be tolerated and this allows interference to be reduced. This is especially advantageous for spread spectrum communications systems such as CDMA where a single frequency band is used. In such cases interference is more of an issue as compared to arrangements which use different frequency bands in neighbouring sectors.

Although the example described immediately above involves cells which are formed from three corner-excited hexagons, the invention is not limited to this cell shape, but may be applied to any suitable cell shape or geometry. For example, centre-excited hexagons may be used. Also, it is not essential for a communications network to be formed from cells of the same geometry or shape. For example, some cells may be formed according to the invention and others may not. One instance of this is where a network comprises mostly three-sector cells, with nine sector cells used only in areas of high demand. In addition, a three-sector cell may easily be upgraded to a nine-sector cell to increase capacity without acquiring any new geographical locations for cell sites.

In a particular embodiment of the nine-sectored, six element, tricellular arrangement, each base station transceiver comprises a multiple beam antenna which has six array columns with an amplitude taper and is approximately 0.5 m wide for operation at about 2 GHz. The amplitude taper provides the advantage that the sidelobe levels are reduced and this enables the communications capacity to be increased.

It is advantageous to arrange the multiple beam antenna such that it provides an orthogonal multiple beam set. This allows a "lossless" multiple beamformer to be used. This minimises power loss effectively to a small insertion loss. Any suitable type of loss less multiple beamformer may be used such as a 6×6 Butler matrix beamformer with paired beam ports to form three low crossover, low sidelobe, orthogonal beams. Lossless multiple beamformers and Butler matrix beamformers are described in more detail in "Introduction to Antennas" by Martin S. Smith, Macmillan, 1988, which is incorporated herein by reference.

By using the lossless multiple beamformer the number of cables required is reduced. For example, in the nine-sectored, six element example discussed above, it is only necessary to use three cables to operate the three antenna beams rather than 6 cables (one per antenna element). This reduces costs and installation requirements. This is because the multiple beamformer can be located at a masthead with the antenna array.

The multiple beam antenna may comprise either dipole or patch antenna elements. Using simulations as described above it was found that the choice of element does affect capacity but only slightly.

Typically the array will consist of six columns of elements, with multiple beams formed in azimuth by feeding the columns through the multiple beamformer.

An example of an orthogonal multiple beam set is that provided by a Butler matrix and which comprises sin x/x beams, (x is defined below), −4 dB cross over points and −13 dB side lobes.

$$X = \sin(\pi SL/\lambda)/(\pi SL/\lambda)$$

where L is the length of the antenna aperture, S is sin θ, and θ is the angle (in degrees) of the beam relative to the boresight of the central beam.

The beam spacing of orthogonal beam sets varies with the amplitude taper and the sin x/x set arises from a uniform amplitude distribution. With a half cosine taper (or a taper which approximates a half cosine taper), the side lobes drop to −23 dB, but the cross over point drops to about −10 dB. This provides a beam set that is suitable for use with the nine-sectored, six element arrangement discussed above.

In a preferred embodiment, adjacent sin x/x beams are summed to produce a half cosine taper array excitation. In this way, a Butler matrix is used, with summed pairs of beam ports, to produce an orthogonal half cosine taper set. In order to provide 2 beams per sector with a four element antenna array, a 4×4 Butler matrix is used in the manner described immediately above. Alternatively, to provide three beams per sector with a six element antenna array, a 6×6 Butler matrix is used also as described immediately above.

For the case of providing 2 beams per sector with a four element antenna array:

Using a 4×4 Butler matrix provides 4 beams with progressive phase shifts as follows (in degrees): −90, 0, +90, +180. Phase offsets to the array elements are used to create a symmetric beam set, with the following progressive shifts (in degrees): −135; −45, +45, +135. This produces beams that point to approximately the following angles (in degrees): −45, −15, +15, +45. By combining these in pairs, two beams at approximately the following angles (in degrees) are formed: −30, +30. These beams have tapered relative amplitudes that are approximately 0.5, 1, 1 and 0.5.

For the case of providing three beams per sector with a six element antenna array:

Using a 6×6 Butler matrix provides 6 beams with progressive phase shifts as follows (in degrees): −120, −60, +60, +120, +180. Phase offsets to the array elements are then used to create a symmetric beam set with progressive shifts as follows (in degrees): −150, −90, −30, +30, +90, +150. This produces beams that point to approximately the following angles (in degrees): −50, −30, −10, +10, +30, +50. Combining these in pairs provides three beams that point to approximately the following angles (in degrees): −40, 0, +40. These beams have tapered relative amplitudes that are approximately 0.5, 0.8, 1, 1, 0.8, 0.5.

In the case of a nine-sectored tri-cellular arrangement as discussed above, the orthogonal beamformer may be a Blass matrix with three beam ports and four array ports. This creates an orthogonal beam set with crossovers at about −6 dB and sidelobes at about −16 dB.

POWER AMPLIFICATION

In one embodiment, power amplifiers are shared across the three antenna beams of each tri-cell by using back to back matrix beamformers. For example, 3×3 Butler matrix beamformers may be used. This enables flexible capacity to be provided as a result of the sharing arrangement. Also, power amplifiers are costly and require complex circuitry to make them linear. This is especially the case for CDMA power amplifiers which need to be extremely linear to cope with the large fluctuations in the CDMA downlink signal envelope power. This is even more the case for a multi-carrier power amplifier used for a multi-bearer downlink. By sharing power amplifiers in this way, costs and complexity are reduced because fewer power amplifiers are required.

As well as this, it is required to be able to use all of the power amplifiers in the multiple beam antenna arrangement at all times. The present arrangement achieves this by virtue of the sharing arrangement. If each power amplifier were instead dedicated to a particular antenna beam then it would not be possible to use that power amplifier for operating the other antenna beams.

Figure 9:
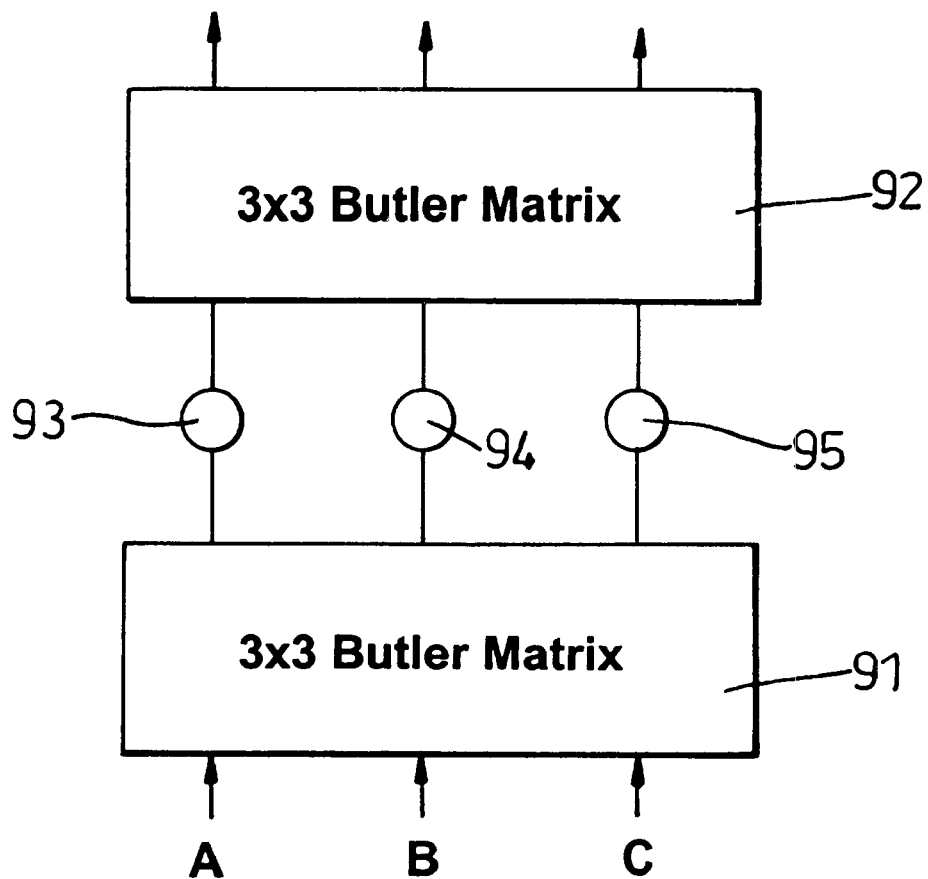
FIG. 9 shows two 3×3 Butler Matrix beamformers arranged back to back for power sharing.

FIG. 9 shows two 3×3 Butler matrix beamformers 91, 92 that are arranged back to back to enable sharing of power amplifiers. The first Butler matrix beamformer 91 has three low power inputs A, B, C, one for each of three antenna beams and three outputs, each of which is connected to one of three power amplifiers 93, 94, 95. The second 3×3 Butler matrix 92 also has three inputs and one of the power amplifiers 93, 94, 95 is connected to each input. The second 3×3 Butler matrix then provides three high power outputs one for each of three antenna beams.

Consider the situation in which it is required to concentrate all power over one antenna beam, for example, because maximum capacity is required over one antenna beam region of the cell. In this case, the first 3×3 Butler matrix is used to divide input power equally over the three power amplifiers 93, 94, 95 in order that the maximum power amplification is achieved using all three available power amplifiers. The second 3×3 Butler matrix 92 is then used to combine the outputs of the three power amplifiers 93, 94, 95 and channel this combined output into the single desired antenna beam. The back to back arrangement of the Butler matrix beamformers 91, 92 is used in this way to distribute the inputs over the available power amplfers as required for particular situations and then to combine or divide the outputs as required. This enables the maximum benefit to be gained from the power amplifiers 93, 94, 95.

The multiple beam antenna is provided at a cell site using a suitable supporting structure as is known in the art. For example, this may comprise a triangular platform, each side of which supports apparatus for generating three antenna beams as described above.

BACKGROUND TECHNOLOGY—CDMA

CDMA is a modulation and multiple access scheme based on spread-spectrum communication, a well-established technology that has been applied recently to digital cellular radio communications. Multiple access allows simultaneous communications on many channels between a base station transceiver and a number of mobile stations. In CDMA, these channels are carried in the same, relatively broad, band of frequencies. The bandwidth is typically 1.25 MHz in IS-95 or 4 MHz in UMTS. The signal (assumed to be vocoded, coded, interleaved etc) in each CDMA channel is spread with a different pseudo-random (PN) binary sequence before being used to modulate an RF carrier. A large number of CDMA signals can share the same frequency band. The signals are separated in a receiver using a correlator, which isolates a particular channel by accepting only signal energy from the selected PN sequence assigned to that channel and despreads its spectrum. Signals on other channels, whose PN sequences do not match, are not despread and, as a result, contribute only weakly to the noise and represent a self-interference generated by the system.

Further background information about CDMA is given in "New Concepts in Multi-User Communications": Proceedings from The Advanced Study Institute Conference on Concepts in Multi-User Communication, Ed. J. K. Skwirzynski. NATO, UK, Aug. 4–16, 1980, which is incorporated herein by reference.

The use of CDMA in mobile communications is specified by Telecommunications Industry Association/Electronics Industry Association standards and draft standards, which are incorporated herein by reference including TIA/EIA/IS-95-A, Mobile Station-Base Station Compatibility Standard for Dual-Mode Wideband Spread Spectrum Cellular System, May 1995, Specification, January 1992.

A range of applications are within the scope of the invention. These include situations in which it is required to increase capacity in a cellular communications network such as a cellular wireless communications network.

The invention also finds application in fixed wireless access (FWA) schemes, where a base station transceiver at a cell site communicates with geographically-fixed subscriber units. In such a scheme, higher sectorisation is possible than with mobile subscriber units because handoffs seldom occur. For example, in a FWA system, if subscriber units have directional antennas then no cell to cell handoffs occur. Also, in such a FWA system, channel angle-scatter is likely to be much reduced as compared with a mobile subscriber system. This enables narrow effective beamwidths to be maintained which reduces interference.

What is claimed is:

1. A multiple beam antenna arrangement suitable for use in a cell of a cellular communications network, said cell being divided into a plurality of regions, and said arrangement being arranged to provide a specified capacity for communication with terminals located in a first one of said regions, said arrangement comprising:
    (i) an apparatus arranged to provide two or more directional antenna beams per region; and wherein said apparatus is further arranged such that in use said capacity is greater than the capacity provided to a region of a corresponding multiple beam antenna arrangement which provides only one antenna beam per region by a factor of approximately the number of antenna beams provided for said first region.

2. An antenna arrangement as claimed in claim 1 wherein said apparatus arranged to provide two or more directional antenna beams per region is further arranged to direct the same number of antenna beams over each region.

3. An antenna arrangement as claimed in claim 1 wherein said apparatus arranged to provide two or more directional antenna beams per region comprises a plurality of antenna elements.

4. An antenna arrangement as claimed in claim 1 wherein said apparatus arranged to provide two or more directional antenna beams per region comprises a beamformer.

5. An antenna arrangement as claimed in claim 4 wherein said beamformer is a Butler matrix beamformer with paired beamports.

6. An antenna arrangement as claimed in claim 2 wherein said apparatus arranged to provide two or more directional antenna beams per region provides three or more directional antenna beams per region and comprises six antenna elements.

7. An antenna arrangement as claimed in claim 6 wherein said cell is divided into three regions.

8. An antenna arrangement as claimed in claim 7 which comprises a 6 by 6 Butler matrix beamformer with paired beamports.

9. An antenna arrangement as claimed in claim 1 which is suitable for use in a cell of a cellular, spread spectrum, communications network.

10. An antenna arrangement as claimed in claim 9 wherein said spread spectrum communications network is a Code Division Multiple Access communications network.

11. An antenna arrangement as claimed in claim 3 wherein said antenna elements are provided in the form of columns.

12. An antenna arrangement as claimed in claim 1 wherein the number of cables is equal to the number of antenna beams that said apparatus is arranged to provide.

13. An antenna arrangement as claimed in claim 1 which comprises at least one power amplifier that is arranged to be shared in use, across the antenna beams associated with a given region.

14. An antenna arrangement as claimed in claim 1 which incorporates an amplitude taper arrangement such that in use, sidelobe levels are reduced.

15. An antenna arrangement as claimed in claim 1 wherein said apparatus arranged to provide two or more directional antenna beams is further arranged such that said directional antenna beams are orthogonal in use.

16. An antenna arrangement as claimed in claim 15 which further comprises a loss less multiple beamformer.

17. A cellular communications network comprising a plurality of cells, and wherein a plurality of said cells each contain a multiple beam antenna arrangement, said multiple beam antenna arrangement being suitable for use in a cell of a cellular communications network, said cell being divided into a plurality of regions, and said arrangement being arranged to provide a specified capacity for communication with terminals located in a first one of said regions, said arrangement comprising:

(ii) an apparatus arranged to provide two or more directional antenna beams per region; and wherein said apparatus is further arranged such that in use said capacity is greater than the capacity provided to a region of a corresponding multiple beam antenna arrangement which provides only one antenna beam per region by a factor of approximately the number of antenna beams provided for said first region.

18. A base station transceiver comprising: a multiple beam antenna arrangement suitable for use in a cell of a cellular communications network, said cell being divided into a plurality of regions, and said arrangement being arranged to provide a specified capacity for communication with terminals located in a first one of said regions, said arrangement comprising:

(i) an apparatus arranged to provide two or more directional antenna beams per region; and wherein said apparatus is further arranged such that in use said capacity is greater than the capacity of a corresponding multiple beam antenna arrangement which provides only one antenna beam per region by a factor of approximately the number of antenna beams provided for said first region.

19. A multiple beam antenna arrangement suitable for use in a cell of a spread spectrum cellular communications network, said cell being divided into three regions, said arrangement comprising: an apparatus arranged to provide three orthogonal, directional, antenna beams per region said beams having reduced cross over points and sidelobe levels; said apparatus comprising a loss less multiple beamformer, six antenna elements, said elements being in the form of columns, and an amplitude taper arrangement.

20. A spread spectrum cellular communications network comprising a plurality of cells and wherein each of a plurality of the cells contain a multiple beam antenna arrangement suitable for use in a cell of a spread spectrum cellular communications network, said cell being divided into three regions, said arrangement comprising: and apparatus arranged to provide three orthogonal, directional, antenna beams per region said beams having reduced cross over points and sidelobe levels; said apparatus comprising a loss less multiple beamformer, six antenna elements, said elements being in the form of columns, and an amplitude taper arrangement.

21. A base station transceiver comprising: a multiple beam antenna arrangement suitable for use in a cell of a spread spectrum cellular communications network, said cell being divided into three regions, said arrangement comprising: an apparatus arranged to provide three orthogonal, directional, antenna beams per region said beams having reduced cross over points and sidelobe levels; said apparatus comprising a loss less multiple beamformer, six antenna elements, said elements being in the form of columns, and an amplitude taper arrangement.

* * * * *